United States Patent
Rubin

(10) Patent No.: US 9,010,766 B2
(45) Date of Patent: Apr. 21, 2015

(54) APPARATUS AND METHODS FOR TEMPORARILY SEALING A PIPE

(75) Inventor: David Edward Rubin, Manville, NJ (US)

(73) Assignee: DPR Futures LLC, Manville, NJ (US)

( * ) Notice: Subject to any disclaimer, the term of this patent is extended or adjusted under 35 U.S.C. 154(b) by 746 days.

(21) Appl. No.: 13/083,859

(22) Filed: Apr. 11, 2011

(65) Prior Publication Data

US 2012/0256379 A1 Oct. 11, 2012

(51) Int. Cl.
*F16L 17/00* (2006.01)
*F16L 55/115* (2006.01)

(52) U.S. Cl.
CPC .......... *F16L 55/1152* (2013.01); *Y10S 285/901* (2013.01)

(58) Field of Classification Search
USPC ......... 277/603, 607, 608, 609, 616, 626–627; 285/342, 343
See application file for complete search history.

(56) References Cited

U.S. PATENT DOCUMENTS

| | | | | |
|---|---|---|---|---|
| 1,075,693 A * | 10/1913 | Cassidy | ......................... | 285/281 |
| 1,823,061 A * | 9/1931 | Pearson | ......................... | 277/607 |
| 2,090,266 A * | 8/1937 | Parker | ........................... | 285/234 |
| 2,230,116 A * | 1/1941 | Kreidel | .......................... | 285/342 |
| 2,247,031 A * | 6/1941 | Norton | ........................... | 277/622 |
| 2,791,452 A * | 5/1957 | Watson | .......................... | 285/342 |
| 3,185,501 A * | 5/1965 | Bowan et al. | .................... | 285/52 |
| 3,186,743 A * | 6/1965 | Russell, Jr. | ..................... | 285/238 |
| 3,468,566 A * | 9/1969 | Nietzel | .......................... | 285/341 |
| 3,498,646 A * | 3/1970 | Depuy | .......................... | 285/339 |
| 3,578,805 A * | 5/1971 | Dutton | ............................ | 285/55 |
| 3,901,268 A | 8/1975 | Mullins | | |
| 3,916,947 A * | 11/1975 | Holmes et al. | ................ | 137/544 |
| 3,970,336 A * | 7/1976 | O'Sickey et al. | ............. | 285/341 |
| 4,077,250 A | 3/1978 | Wesch | | |
| 4,138,145 A * | 2/1979 | Lawrence | ......................... | 285/23 |
| 4,230,325 A * | 10/1980 | Butler et al. | ................... | 277/622 |
| 4,324,270 A | 4/1982 | Mullins | | |
| 4,635,975 A * | 1/1987 | Campbell | ...................... | 285/340 |
| 4,886,304 A * | 12/1989 | Kunsman | ...................... | 285/104 |
| 4,982,763 A | 1/1991 | Klahn | | |
| 5,066,051 A * | 11/1991 | Weigl et al. | ................... | 285/328 |
| 5,172,557 A | 12/1992 | Hubbell, Jr. | | |
| 5,224,516 A | 7/1993 | McGovern et al. | | |
| 5,655,797 A * | 8/1997 | Edstrom et al. | ............... | 285/342 |
| 5,673,946 A * | 10/1997 | Barber et al. | .................. | 285/328 |

(Continued)

FOREIGN PATENT DOCUMENTS

GB 2083153 A 3/1982
WO 98/51958 A1 11/1998

*Primary Examiner* — Kristina Fulton
*Assistant Examiner* — Eugene G Byrd
(74) *Attorney, Agent, or Firm* — Rita C. Chipperson, Esq.; Chipperson Law Group, P.C.

(57) ABSTRACT

Apparatus and methods for temporarily sealing a pipe including apparatus and methods for creating a temporary airtight seal at the open end of a pipe in a plumbing or refrigeration system. One such apparatus includes a body, grommet, washer, and a nut. Multiple airtight seals are created including a first primary seal between an exterior of the pipe and the grommet and a secondary seal between the open end of the pipe and the washer. The grommet does not require teeth and the apparatus does not require adhesive, sealant, or any other type of similar materials. Use of the apparatus and methods greatly minimizes and/or eliminates the potential for marring or otherwise distorting the open end of the pipe, thereby facilitating reuse of same.

11 Claims, 7 Drawing Sheets

(56) References Cited

U.S. PATENT DOCUMENTS

| | | | |
|---|---|---|---|
| 5,676,174 A | 10/1997 | Berneski, Jr. et al. | |
| 5,855,397 A * | 1/1999 | Black et al. | 285/93 |
| 5,954,375 A * | 9/1999 | Trickle et al. | 285/342 |
| 6,070,883 A * | 6/2000 | Marto | 277/609 |
| 6,170,530 B1 * | 1/2001 | Steblina | 138/89 |
| 6,193,238 B1 * | 2/2001 | Sporre | 277/609 |
| 6,378,915 B1 * | 4/2002 | Katz | 285/342 |
| 6,409,179 B1 * | 6/2002 | Daoud | 277/602 |
| 6,435,519 B1 * | 8/2002 | White | 277/609 |
| 6,883,547 B1 * | 4/2005 | Jorgensen | 138/89 |
| 6,974,162 B2 * | 12/2005 | Chelchowski et al. | 285/382.7 |
| 6,981,524 B2 * | 1/2006 | Jorgensen | 138/89 |
| 7,419,192 B2 | 9/2008 | Benoit et al. | |
| 7,484,696 B2 * | 2/2009 | Kim | 248/49 |
| 7,806,443 B1 * | 10/2010 | Plattner | 285/249 |
| 8,146,953 B2 * | 4/2012 | Nakata et al. | 285/249 |
| D659,225 S * | 5/2012 | Rubin | D23/260 |
| 2004/0169370 A1 * | 9/2004 | Chelchowski et al. | 285/249 |
| 2006/0145478 A1 * | 7/2006 | Hwang | 285/353 |
| 2008/0164695 A1 * | 7/2008 | Schiroky et al. | 285/342 |
| 2010/0025990 A1 * | 2/2010 | Williams et al. | 285/342 |
| 2010/0059996 A1 * | 3/2010 | Ciprich et al. | 285/342 |
| 2011/0031702 A1 * | 2/2011 | Wilson et al. | 277/608 |

\* cited by examiner

APPARATUS AND METHODS FOR TEMPORARILY SEALING A PIPE

BACKGROUND OF THE INVENTION

Embodiments of the present invention generally relate to apparatus and methods for temporarily sealing a pipe. More specifically, the present invention relates to apparatus and methods for creating a temporary airtight seal at the open end of a pipe in a plumbing or refrigeration system.

Refrigeration systems are typically comprised of an evaporator that vaporizes liquid refrigerant to cool the surrounding environment; a compressor that highly pressurizes the recently evaporated refrigerant; and a condenser that returns the refrigerant to a liquid state. Each of these components is typically connected by pipes or other fluid conduits. The entire system is airtight (i.e., no air from the outside environment can enter the system). Refrigeration systems must be airtight so that: pressure is maintained in the various pipe lines; no refrigerant leaks out of the refrigeration system; and no air or other contaminants from the surrounding environment enters the pipes.

Refrigerants utilized in refrigeration systems are typically liquid compounds with appropriate thermodynamic properties to undergo a phase change from liquid to gas in order to cool the surrounding environment. As refrigerant evaporates, it absorbs heat energy from the environment thereby decreasing the temperature of the environment. Many compounds are known in the art that possess the thermodynamic properties appropriate for use in a refrigeration system. One such compound is chlorodifluoromethane, which is also known as HFCF-22 or R-22. However, this compound and other similar compounds are believed to have negative environmental effects such as ozone depletion. Therefore, use of chlorodifluoromethane and other compounds with similar environmental consequences is being reduced or eliminated, and alternative compounds that do not effect the same environmental consequences are being utilized. One such new replacement refrigerant is R410A, which is also known as AZ-20 or Puron, and it is a mixture of compounds including the synthetic oil polyoester. The chemical nature of this mixture causes the refrigerant to be highly hygroscopic. That is, R410A refrigerant strongly attracts and absorbs water molecules from the surrounding environment.

As refrigerants that are believed to have negative environmental consequences are no longer being manufactured and will eventually become unavailable for purchase or use, existing refrigeration systems incorporating these outdated refrigerants will eventually require an upgrade to accommodate the newer refrigerants. That is, to repair a refrigeration system that incorporates an unavailable refrigerant, it may be necessary to replace the existing condenser with a new condenser compatible with currently available refrigerants. This process involves cutting the existing pipe lines; removing the old condenser; and installing a new condenser and evaporator that utilize the new refrigerant.

Cutting pipes may also be required if pipes and fluid conduits become damaged or corroded. For example, a pipe may become corroded over time due to surrounding environmental conditions. Additionally, existing plumbing lines are sometimes accessed in order to add new fluid lines for system additions. Regardless of the reason, pipes and other fluid conduits are typically serviced by removing a portion of the conduit (e.g., the portion of the conduit that is damaged) and replacing it with a new piece of conduit.

In a refrigeration system, the open end of the pipe that has been cut must be sealed quickly in order to prevent air and water contamination and to quickly recreate the airtight system. This is even more critical with newer hygroscopic refrigerants, which are more susceptible to contamination due to their strong attraction of water from the surrounding environment. That is, if a hygroscopic refrigerant such as R410A is utilized in the refrigeration system, water moisture in air that enters a refrigeration system is quickly absorbed by the refrigerant oil, thereby causing contamination. When the system is reassembled, the lines and/or existing components which contain the hygroscopic polyoester oil must now be thoroughly cleaned through a process known in the art as nitrogen purging and triple evacuating, a very time consuming effort. Such contamination effects other negative consequences including, but not limited to: reduced cooling performance; malfunction of the evaporator; increased compressor noise; and/or compressor failure.

In non-hygroscopic systems, any contamination due to the entry of air into the refrigeration system may be remedied by vacuum purging the air prior to use of the system. However, since a hygroscopic refrigerant is contaminated by both water and air, it generally must be discarded and replaced by new refrigerant as water cannot be removed as easily as air. Therefore, sealing the open end of a cut pipe in a relatively short time frame is even more critical for hygroscopic systems to prevent the time and cost associated with refrigerant replacement.

One method commonly known in the art for temporarily sealing the open end of a pipe is to pinch it closed and then braze the edges together. That is, the metal walls of the pipe are compressed until the opening created by the cut is closed. An airtight seal is then created by joining the edges of the metal walls via heating of a filler metal alloy to a temperature at which the filler metal alloy melts and flows between the pinched edges of the fluid conduit as is commonly known in the art. Such a method effectively creates an airtight seal at the open end of the cut pipe. However, as is commonly known in the art, this method can take a relatively long period of time to implement and results in formation of oxidation residue on the interior surface of the fluid conduit. Additionally, upon connection of the sealed fluid conduit with other components, the portion of the fluid conduit affected by the airtight seal (i.e., the portion of the fluid conduit that is pinched closed and brazed to create an airtight seal) must be removed prior to connection of other components. The removal process is time consuming and can result in excessive refrigerant contamination.

Another way to create a temporary air-tight seal on the open end of a pipe is to couple an apparatus to the outer diameter of the pipe that grips the outer surface of the pipe via a plurality of teeth. That is, such a method grips the outer surface of the pipe with the teeth of the apparatus with sufficient strength to maintain an elevated internal pressure in the pipe and an air-tight seal between the interior of the pipe and the surrounding environment. As the internal pressure of the pipe is increased, the force with which the teeth grip the outer surface of the pipe increases. While providing an air-tight seal for the open end of a pipe, the teeth may also scar or mar the outer surface of the pipe, thereby necessitating removal of the pipe end to maintain the integrity of the piping and/or refrigeration system.

Also known in the art, a temporary air-tight seal may be created on the open end of a pipe via coupling of an apparatus to the open end of a pipe and then securing the apparatus via adhesion of the apparatus to the outer surface of the pipe. That is, an adhesive is applied to the one or more of the internal surfaces of the apparatus such that the surfaces will contact and adhere to the outer surface of the pipe upon installation of the apparatus. While providing an air-tight seal for the open end of a pipe, use of an adhesive prevents easy and/or rapid removal of such an apparatus from the open end of a pipe. It can also necessitate removal of the pipe end to maintain the integrity of the piping and/or refrigeration system.

BRIEF SUMMARY OF THE INVENTION

Briefly stated, in one aspect of the present invention, an apparatus for creating a seal on the end of an open pipe is provided. The apparatus includes: a body, the body including a threaded end, the threaded end surrounding a grommet cavity, the grommet cavity located external to and adjacent a recess; a grommet, the grommet shaped substantially identical to a shape of the grommet cavity, the grommet seated in the grommet cavity; a washer seated upon a floor of the substantially cylindrical recess; and a nut, the nut including a cavity, the cavity inversely threaded to mate with the threaded end, the nut threaded to the threaded end.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
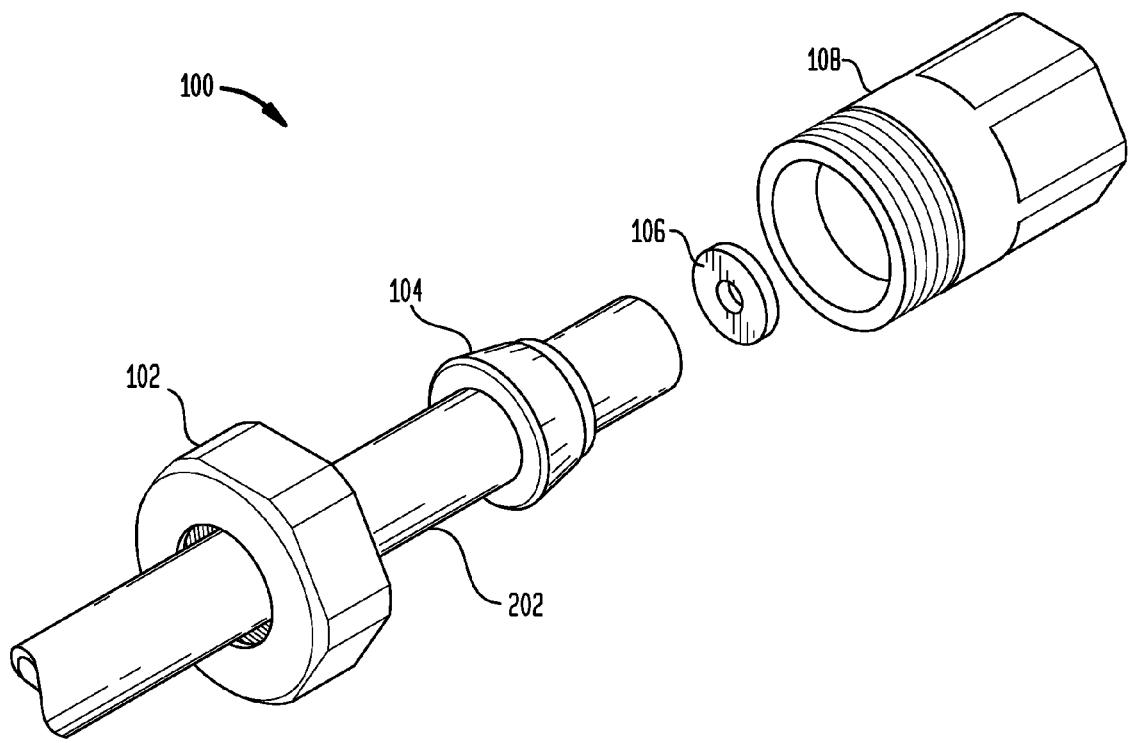
FIG. 1 is a an exploded perspective view of a cap assembly prior to attachment to a pipe in accordance with one embodiment of the present invention.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a cap" may include a plurality of caps. Thus, for example, a reference to "a method" includes one or more methods, and/ or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Referring first to FIG. 1, depicted is an exploded perspective view of cap assembly 100 in accordance with one embodiment of the present invention. Cap assembly 100 includes, inter alia, nut 102, grommet 104, washer 106, and body 108. Cap assembly 100 is designed to temporarily seal refrigerant pipes or lines (hereinafter referred to as "refrigerant pipes or piping") such as those used to connect a condenser or heat pump to an evaporator coil. When installed on a refrigerant pipe, cap assembly 100 provides an air tight seal capable of withstanding high pressures within the pipe of 25 pounds per square inch, however, typically there will be no pressure in the pipe when cap assembly 100 is installed since the system is typically not operational.

Also, cap assembly 100 can be quickly coupled to a refrigerant pipe. The speed of installation is beneficial, for example, when replacing a portion of an existing refrigerant pipe or replacing an outdated refrigerant/condenser with a newer refrigerant/condenser. To do this, the refrigerant is first removed from the system. Then, the pipe is cut in the proximity of the component to be repaired or replaced. As soon as possible after the pipe is cut, an airtight seal is applied to the open ends created by the cuts to minimize contamination of the refrigerant. Contamination can occur because, in systems utilizing R410-A, or any Hydrofluorocarbon ("HFC") refrigerant that utilizes a polyester oil, the refrigerant oil (i.e., the polyoester) in the system is hygroscopic. That is, it removes water from the surrounding atmosphere. Therefore, as air enters the cut end of the pipe and contacts the refrigerant oil that remains in the system after the refrigerant has been removed for repair or component replacement, moisture is removed from the ambient air and absorbed by the refrigerant oil thereby causing contamination thereof. Refrigerant oil that has been contaminated with moisture cannot be used in a refrigeration system and must be either cleaned or replaced. Therefore, installing the cap assembly on a cut end of a pipe in a relatively short time frame, reduces the amount of air contamination within the refrigerant oil, which allows the refrigerant oil to be reused.

Figure 2:
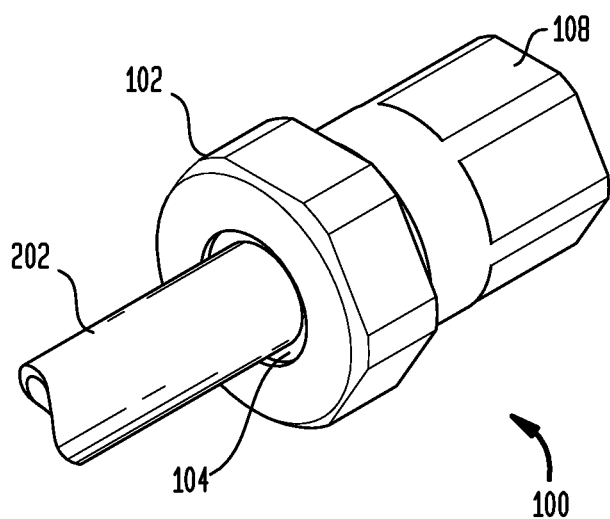
FIG. 2 is a perspective view of the assembled cap assembly of FIG. 1 fitted to the end of the pipe.

Turning now to FIG. 2, depicted is a perspective view of cap assembly 100 installed on an exemplary refrigerant pipe 202. However, cap assembly 100 may also be installed on pipes other than refrigerant pipes without departing from the scope of the present invention. It is envisioned that cap assembly 100 may be manufactured having a plurality of sizes to accommodate attachment to and sealing of pipes having varying outside diameters including, but not limited to, ⅜", ⅝", ¾", ⅞", and 1⅛". For example, a user of the present invention may carry a full set of cap assemblies 100 (i.e., at least one or two cap assemblies for each outside pipe diameter). This will allow a user to easily and quickly seal any size pipe via the method discussed in greater detail below. Each differently sized cap assembly 100 may be marked with information regarding the size of pipe for which it is appropriate. Additionally, the components of differently sized cap assembly 100 may be color coordinated using a separate, distinct color for each cap assembly 100 so that the user may easily locate the appropriate cap assembly components required to seal a pipe of any diameter.

Figure 3:
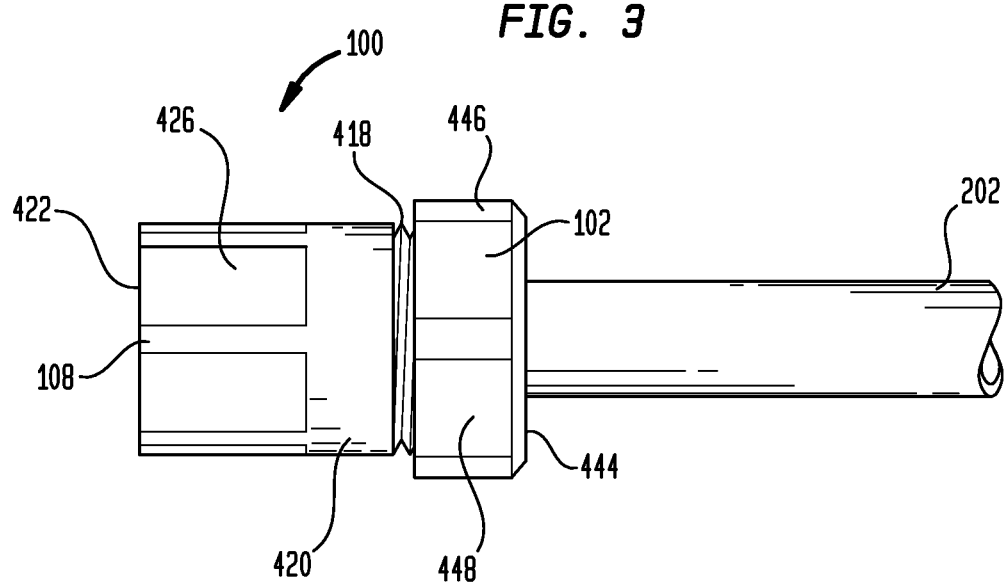
FIG. 3 is a side elevational view of the cap assembly of FIG. 2 fitted to the end of the pipe.
Figure 4:
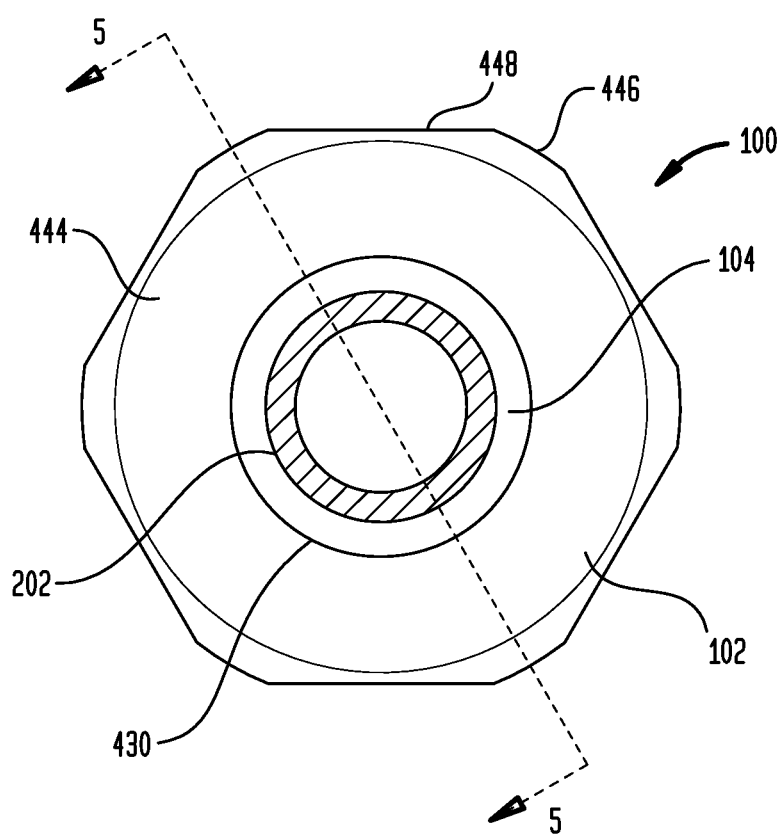
FIG. 4 is a top view of the cap assembly of FIG. 2.
Figure 5:
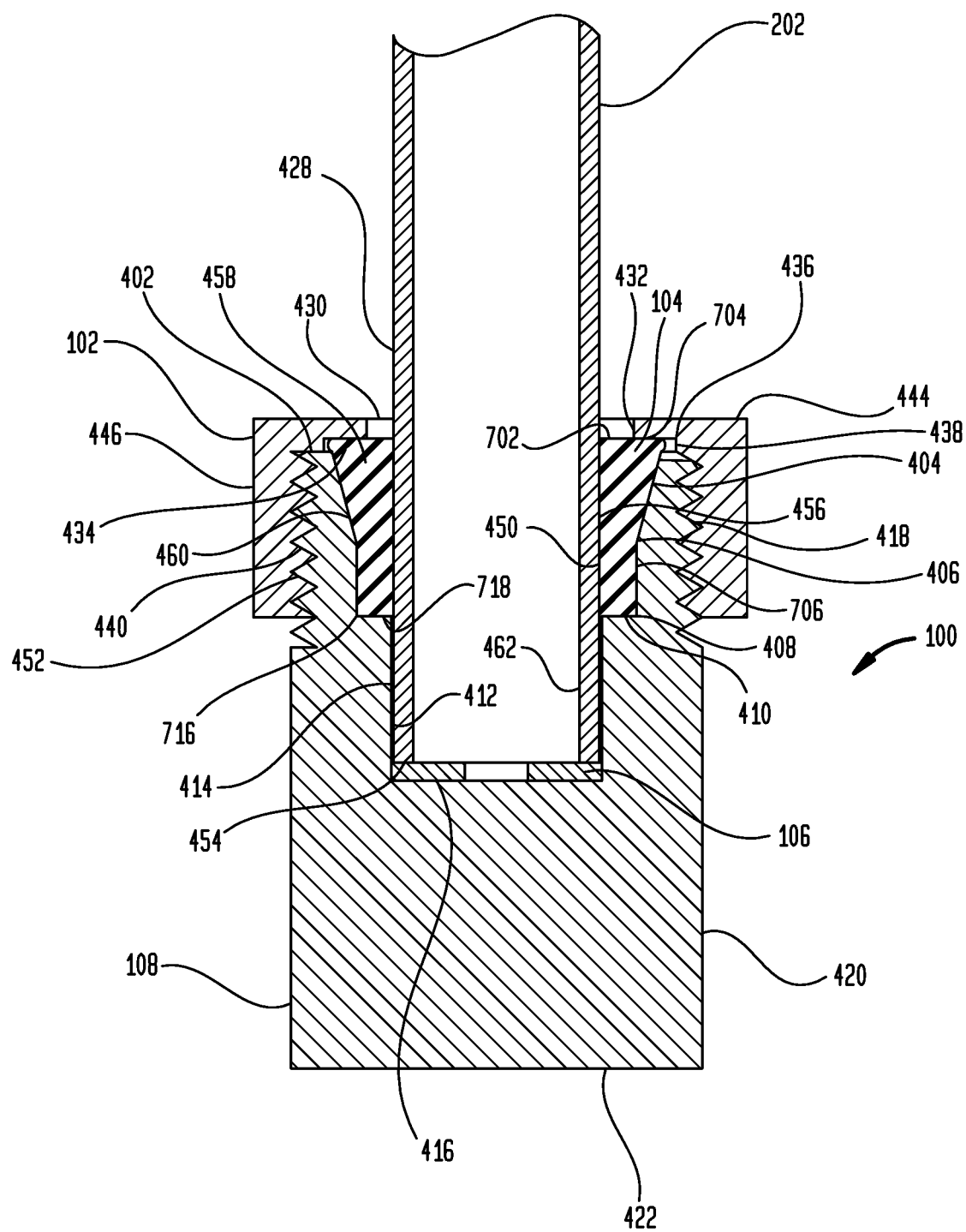
FIG. 5 is a cross-sectional view of the cap assembly of FIGS. 1-4 taken along lines 5-5 of FIG. 4.

Turning now to FIGS. 3, 4, and 5, depicted are side elevational, top, and cross-sectional views, respectively, of cap assembly 100 fitted to exemplary refrigerant pipe 202. As depicted, body 108 is a tubular body of anodized aluminum (or other materials including, but not limited to, polyvinyl chloride ("PVC") and extruded plastics) machined to the free state shape illustrated in FIGS. 3, 4, and 5. As best seen in FIG. 5, body 108 has a large diameter open end 458 with a substantially horizontal upper surface 402. The innermost border of surface 402 intersects with grommet cavity 460. Grommet cavity 460 is bound by frusto-conical inner wall 404, the latter of which slopes axially downward and radially inward at an angle of approximately 30 degrees until point 406. From point 406, inner wall 404 extends axially downward with a substantially fixed radial diameter to corner 408. At corner 408, inner wall 404 transitions in a substantially perpendicular manner to substantially horizontal wall 410, which extends radially inward until it intersects recess 412. Recess 412 is substantially cylindrical and is recessed in wall 410. Inner wall 414 of recess 412 extends axially downward with a substantially fixed radial diameter until it intersects in a substantially perpendicular manner with horizontal floor 416. The circumference of inner wall 414 is machined to substantially mate with or match the circumference of outer wall 428 of the pipe 202 to be sealed by cap assembly 100. That is, recess 412 is machined to accept the open end of pipe 202. A clearance between the circumference of inner wall 414 and the outer diameter of pipe 202 of approximately 0.10 inches allows a user to quickly slide body 108 over the open end of pipe 202.

Still referring to FIG. 5, the outermost border of upwardly facing surface 402 intersects substantially perpendicularly with threads 418 of exterior wall 420. Threads 418 are machined to mate with nut 102 as discussed in greater detail below. As best seen in FIG. 3, from the bottommost edge of threads 418, substantially cylindrical exterior wall 420 proceeds axially downward with a substantially fixed radial diameter. The bottommost end of exterior wall 420 intersects substantially perpendicularly with substantially horizontal downwardly facing surface 422.

Figure 8:
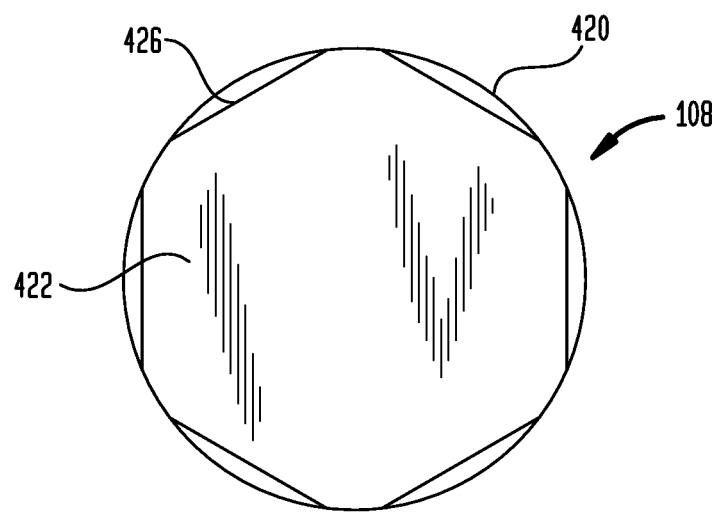
FIG. 8 is a bottom view of the body of the cap assembly of FIGS. 1-5.

Exterior wall 420 includes wrench surfaces 426, as best seen in the bottom view of FIG. 8. As seen in FIG. 8, each wrench surface 426 forms a substantially planar chord passing through exterior wall 420 and downwardly facing surface 422. The substantially planar nature of surfaces 426 allows a user to tightly grip body 108 with a wrench during the installation process. That is, each planar surface 426 is designed to engage opposing inner surfaces of the head of a wrench.

Although the depicted body 108 is made of anodized aluminum, other materials may be substituted without departing from the scope of the present invention including, but not limited to, polyvinyl chloride, acrylonitrile butadiene styrene, brass, or stainless steel.

Figure 6:
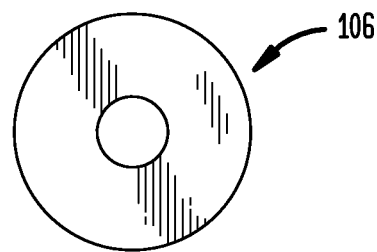
FIG. 6 is a top view of the washer of the cap assembly of FIGS. 1-5.

Referring now to FIG. 6, depicted is a top plan view of washer 106. In the depicted embodiment, washer 106 is manufactured of rubber and it is ring-shaped. That is, in the depicted embodiment, washer 106 is an O-ring. In one embodiment of the present invention, the thickness of washer 106 is approximately 0.10 inches. The diameter of washer 106 will vary depending upon the particular size of cap body 108. However, varying shapes of washer 106 may be substituted without departing from the scope of the present invention. Also, washer 106 may be made of a material other than rubber without departing from the scope of the present invention. Further, a solid rubber plug sized to plug into the cut pipe end may be substituted for washer 106 without departing from the scope of the present invention.

When cap assembly 102 is assembled as discussed in greater detail below, washer 106 is compressed between floor 416 of recess 412 and the bottommost surface 454 of the open end of exemplary refrigerant pipe 202. This position and compression allows the ring-shaped washer to completely contact the ring-shaped outer wall of exemplary refrigerant pipe 202 such that washer 106 cushions the open end of refrigerant pipe 202 to prevent, or minimize, damage thereto caused by recess 412. It also forms a substantially airtight secondary seal between the open end of refrigerant pipe 202 and body 108 and/or cap assembly 100.

Referring again to FIGS. 4 and 5, nut 102 is made of anodized aluminum (or other material including, but not limited to, PVC or extruded plastic) and is machined to the free-state shape illustrated therein. Nut 102 has a smaller diameter open end with a centrally located aperture 430 and threaded cavity 452. Aperture 430 is bounded by inner wall 432. The bottommost end of inner wall 432 intersects substantially perpendicularly with downwardly facing surface 434. Downwardly facing surface 434 proceeds radially outward in a substantially horizontal manner until outer corner 436, at which it intersects with substantially cylindrical inner wall 438. Inner wall 438 proceeds axially downward with a substantially fixed circumference with the exception of threads 440. As depicted in FIG. 5, threads 440 facilitate coupling of body 108 to a nut such as nut 102. That is, body 108 is coupled to nut 102 via threading of threads 418 of body 108 into the substantially cylindrical, inversely threaded cavity of nut 102.

At its topmost end, inner wall 432 intersects in a substantially perpendicular manner with upwardly facing surface 444. Upwardly facing surface 444 is substantially horizontal. At the outermost perimeter of surface 444, it intersects in a substantial perpendicular manner with outwardly facing surface 446. As best seen in FIG. 3, outwardly facing surface 446 includes a plurality of wrench surfaces 448. Each wrench surface 448 forms a chord passing through outwardly facing surface 446 and upwardly facing surface 444 in a substantially planar manner as seen in FIG. 4. The substantially planar nature of surfaces 448 allows a user to tightly grip nut 102 with a wrench during the installation process. That is, each planar surface 448 is designed to engage opposing inner surfaces of the head of a wrench.

Figure 7:
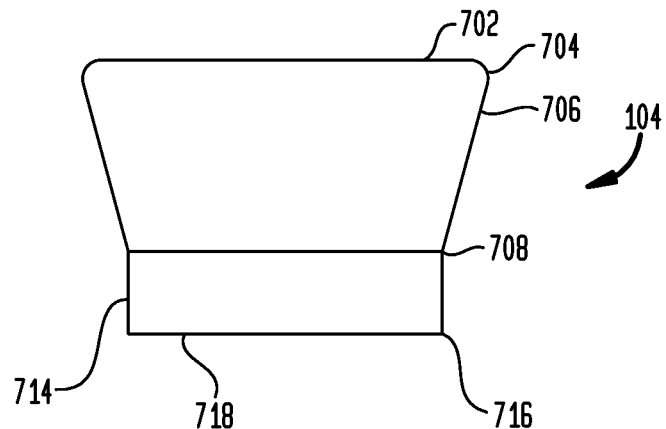
FIG. 7 is a side elevational view of the grommet of the cap assembly of FIGS. 1-5.

Grommet 104 is molded to the free form state illustrated in FIGS. 5 and 7. Grommet 104 is composed of an elastomeric material such as extruded rubber (e.g., extruded Butyl Rubber). Grommet 104 has a substantially cylindrical inner wall 450 with a central aperture 456. The elastomeric nature of the material of grommet 104 allows cap assembly 100 to be coupled to the open end of a cut pipe 202 without contaminating, deforming, or marring internal surface 462 or external surface 428 of pipe 202 in any manner as described in further detail below with reference to FIG. 9. At the topmost end of wall 450, grommet 104 transitions in a substantially perpendicular manner to upwardly facing surface 702. When grommet 104 is inserted into grommet cavity 460, upwardly facing surface 702 is located approximately three sixteenths of an inch (3⁄16") above substantially horizontal upper surface 402. This relative sizing enables nut 102, when tightened, to compress downwardly facing surface 718 of grommet 104 against substantially horizontal surface 410 of body 108, thereby creating the primary airtight seal discussed herein below with respect to FIG. 9.

Surface 702 proceeds radially outward in a substantially horizontal manner until outer perimeter 704. At outer perimeter 704, surface 702 intersects with outwardly facing surface 706, the latter of which converges radially inward and axially downward at an angle of approximately 30 degrees until edge 708. At edge 708, outwardly facing surface 714 transitions in a substantially perpendicular manner to downwardly facing surface 718. Substantially horizontal downwardly facing surface 718 proceeds radially inward until it intersects with the bottom most end of inner wall 450.

Figure 9:
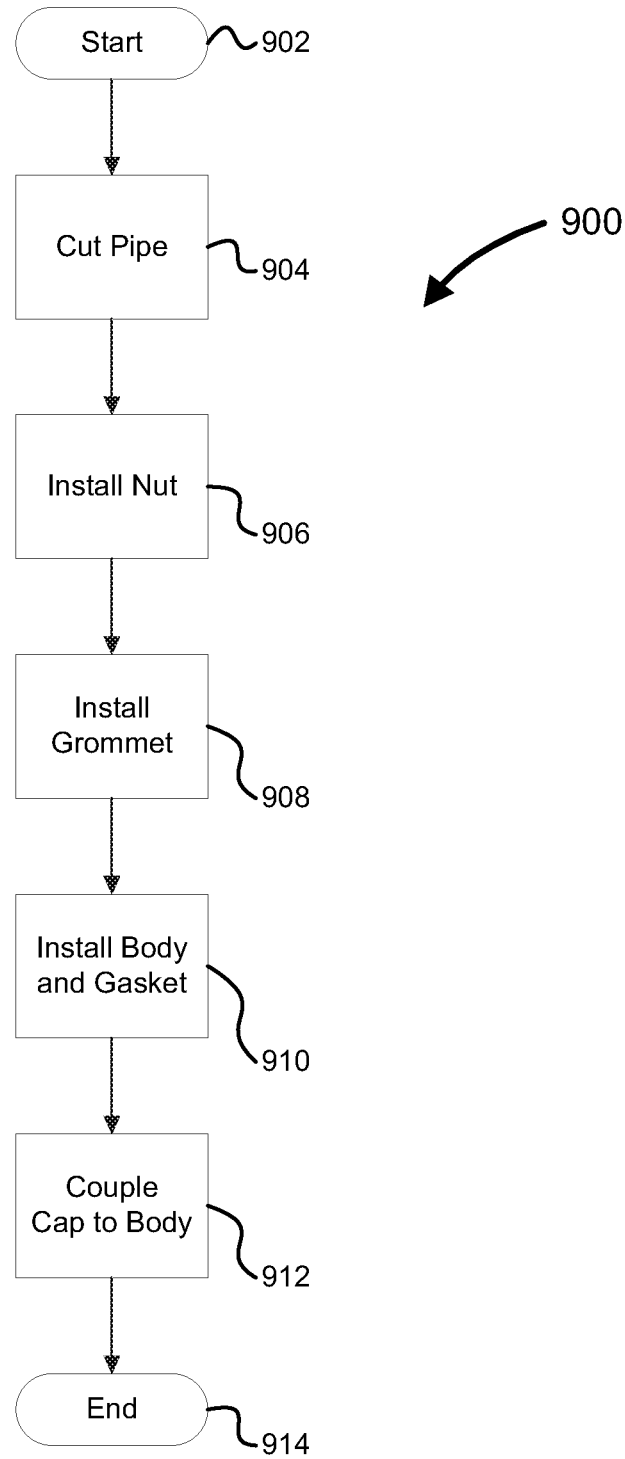
FIG. 9 is a flowchart of the steps of a method for using a cap assembly in accordance with one embodiment of the present invention.

Referring lastly to FIG. 9, depicted is a flowchart of the steps of a method for using a cap assembly such as cap assembly 100 in accordance with one embodiment of the present invention. Process 900 starts at 902, at which a refrigerant pipe or other fluid conduit requires replacement or modification. As previously discussed, refrigerant pipes must be repaired if they become damaged or corroded by the surrounding environment. Additionally, modification to previously existing refrigerant pipes or other fluid conduits may be required due to installation of new components or replacement of an outdated refrigerant and/or condenser with a newer refrigerant and/or condenser.

Process 900 then proceeds to 904, at which a pipe such as exemplary pipe 202 is cut. The pipe may be cut using a pipe cutter or any other suitable method or tool as is commonly known in the art. Whatever means used to cut the pipe, it should be performed in a relatively short time frame in order to minimize air contamination as discussed above. After pipe 202 is cut, the following steps are performed relatively quickly to minimize contamination of the refrigerant.

Next, at step 906, a nut (e.g., nut 102) is installed on the open end of a pipe such as pipe 202. In our exemplary embodiment, nut 102 is installed on pipe 202 by sliding the open end of pipe 202 through aperture 430 until it exits threaded cavity 452 to a sufficient distance to allow the other components of cap assembly 100 to also be passed over the open end of pipe 202. That is, upwardly facing surface 444 is farther from the open end of the pipe than threaded cavity 452. Again, this step should be completed quickly to minimize air contamination.

Next, at step 908, grommet 104 is installed on the open end of pipe 202. Grommet 104 is installed on pipe 202 by sliding the open end of pipe 202 through aperture 456 of grommet 104 to a sufficient distance to allow the other components of cap assembly 100 to also be passed over the open end of pipe 202. That is, grommet 104 is oriented so that upwardly facing surface 702 is farther from the open end of pipe 202 than downwardly facing surface 716. When installing grommet 104, in addition to allowing sufficient distance for the other components of cap assembly 100 to be passed over the open end of the pipe, grommet 104 should be located as close to its final position as possible to allow it to easily slide into grommet cavity 460 of body 108 in the next step. Again, this step should be completed quickly to minimize air contamination.

Next at 910, body 108 is installed on the open end of pipe 202. As previously discussed above, washer 106 is contained in recess 412 and rests on floor 416 of recess 412. Body 108 is installed by sliding the smaller diameter open end 458 of body 108 over the open end of pipe 202 until the bottommost surface 454 of pipe 202 contacts washer 106. That is, the open end of pipe 202 slides inside recess 412 until it contacts washer 106 contained therein. Simultaneously, grommet cavity 460 of body 108 encases grommet 104 previously fitted to pipe 202 in a manner that contact is made between surfaces 706, 710, 714, and 718 of grommet 104 and walls 404 and 410 of body 108, thereby creating a primary airtight seal between the refrigerant system and the outside environment. Grommet 104 forms a compression fitting for pipe 202, and its material allows it to flex and form this primary airtight seal which may later be easily released without damaging pipe 202. Additionally, as body 108 is installed, body 108 may force grommet 104 away from the open end of pipe 202 as required to achieve proper fit. That is, the pressure applied by body 108 as it is passed over the open end of pipe 202 forces grommet 104 to move further away from the open end of pipe 202 as needed until the bottommost surface 454 of pipe 202 contacts washer 106. The contacting of washer 106 by surface 454 of pipe 202 may cause a secondary airtight seal to be created between the refrigerant system and the outside environment as further discussed above. In this manner, the possibility of refrigerant contamination is reduced or completely eliminated. In some alternate embodiments of the present invention, the surface 454 of pipe 202 compresses washer 106 in addition to contacting washer 106 to form a tighter seal.

Process 900 then proceeds to 912 at which threads 418 of the exterior wall 420 of body 108 are coupled with threads 440 of the inversely threaded cavity 452 of nut 102. The threads are coupled by rotating nut 102 in a clockwise direction relative to the position of body 108. Nut 102 can be rotated by hand, by a wrench, or via a combination thereof. To couple nut 102 and body 108, opposing inside surfaces of the head of a wrench engage planar wrench surfaces 426 of body 108. This allows an installer of cap assembly 100 to hold body 108 in a stationary position while nut 102 is threaded onto body 108. If nut 104 is tightened by a wrench, planar wrench surfaces 448 of nut 102 may also be engaged by opposing inside surfaces of the head of a second wrench to allow nut 102 to be rotated via rotation of the arm of the wrench while body 108 is maintained in a stationary position via the first wrench. That is, body 108 is maintained in a static position while nut 102 is rotated. Alternatively, any other method for engaging the threads of nut 102 and body 108 can be substituted without departing from the scope of the present invention. As nut 102 is coupled to body 108, downwardly facing surface 434 of nut 102 contacts and compresses upwardly facing surface 702 of grommet 104.

As nut 102 and body 108 are coupled, the space therebetween is reduced causing compression of grommet 104 by the inner surfaces of nut 102 and body 108. As grommet 104 is compressed, pressure is exerted on the outer wall 428 of exemplary pipe 202. That is, the pressure exerted on surfaces 702, 706, 710, 714, and 718 of grommet 104 by the inner surfaces of the other components of cap assembly 100 causes pressure to be exerted on the outer wall 428 of pipe 202 by internal wall 450 of the grommet. The pressure exerted on outer wall 428 of pipe 202 clenches the end of pipe 202; thereby preventing cap assembly 100 from being dislodged. In this manner, cap assembly 100 is securely retained on the open end of pipe 202 without damaging the pipe in any manner. That is, the elastomeric nature of the material of grommet 104 does not contaminate, deform, or mar internal surface 462 or external surface 428 of pipe 202 in any manner as 104 includes no teeth and does not require welding or adhesive for installation thereof.

In addition to clenching the open end of pipe 202, the pressure exerted by the threading of nut 102 and body 108 creates the primary airtight seal. This airtight seal between the surrounding atmosphere and the inside of pipe 202 is the primary method of preventing contamination.

After the bottommost surface 454 of exemplary pipe 202 contacts washer 106 in step 908 and/or nut 102 is completely threaded on to body 108, a secondary airtight seal may be created. The threading of nut 102 to body 108 as well as the compression of pipe 202 by grommet 104 couples cap assembly 100 to pipe 202 in a manner that prevents accidental dislodgement of 100 from 202. In this manner, the internal pressure in pipe 202 may be maintained and the potential of refrigerant contamination due to the external atmosphere is minimized or eliminated.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An apparatus for quickly creating a seal on the cut end of an open pipe comprising:
    a substantially solid, substantially tubular body, said body including a threaded open end and a closed end, said threaded open end surrounding a grommet cavity, said grommet cavity adjacent to a substantially cylindrical recess and including a substantially horizontal grommet cavity surface at its bottommost point, said substantially cylindrical recess recessed in said substantially horizontal grommet cavity surface, an inner diameter of an inner wall of said substantially cylindrical recess approximately equal to an outer diameter of said cut end of said open pipe;
    a grommet, said grommet shaped substantially identical to a shape of said grommet cavity, said grommet including a grommet downwardly facing surface, said grommet seated in said grommet cavity such that said grommet downwardly facing surface mates with said substantially horizontal grommet cavity surface, said grommet including a central aperture approximately equal to said outer diameter of said cut end of said open pipe;
    a nut, said nut including a cavity, said cavity inversely threaded to mate with said threaded end, a downwardly facing surface of said nut directly in contact with an upwardly facing surface of said grommet when said nut is mated to said threaded end; and
    a washer seated upon a floor of said substantially cylindrical recess, said washer compressed between said floor and a bottommost surface of said cut end of said open pipe when said nut is mated to said threaded end.

2. An apparatus according to claim 1, wherein said seal is airtight.

3. An apparatus according to claim 1, wherein said grommet and said grommet cavity include a frusto-conical first end and a substantially cylindrical second end, said substantially cylindrical second end having a diameter smaller than a smallest diameter of said frusto-conical first end, said first end connected to said second end via a substantially horizontal radial wall extending from an exterior perimeter of said second end to an inner perimeter of a smallest diameter portion of said frusto-conical first end.

4. An apparatus according to claim 1, wherein an unthreaded portion of said body is substantially cylindrical.

5. An apparatus according to claim 1, wherein at least one of the group consisting of said nut, said body, and combinations thereof includes at least two wrench surfaces.

6. An apparatus according to claim 1, wherein said washer is an O-ring.

7. An apparatus according to claim 1, wherein a material of at least one of the group consisting of said grommet, said washer, and combinations thereof is compressible.

8. An apparatus according to claim 1, wherein a material of at least one of the group consisting of said nut, said body, and combinations thereof is anodized aluminum.

9. An apparatus according to claim 1, wherein said grommet is toothless.

10. An apparatus according to claim 1, wherein said apparatus does not require use of at least one of the group consisting of an adhesive, a sealant, and combinations thereof.

11. An apparatus according to claim 1, wherein at least one of the group consisting of said body, said nut, and combinations thereof includes at least one wrench surface.

* * * * *